July 22, 1941.  M. H. VOIGTRITTER  2,250,086
MACHINE FOR VENDING BOTTLED BEVERAGES
Filed Oct. 21, 1937   7 Sheets-Sheet 6

Inventor.
Max Hermann Voigtritter.
By: Carl S. Lloyd
Atty.

Patented July 22, 1941

2,250,086

UNITED STATES PATENT OFFICE 2,250,086

MACHINE FOR VENDING BOTTLED BEVERAGES

Max Hermann Voigtritter, Chicago, Ill., assignor to Mills Novelty Company, Chicago, Ill., a corporation of Illinois Application October 21, 1937, Serial No. 170,230

8 Claims. (Cl. 312—36)

This invention relates to vending machines of the coin-controlled type and more particularly to a machine adapted to refrigerate and vend bottled beverages. The primary object of the invention is to provide a relatively inexpensive machine of this type in which the refrigeration may be accomplished, if desired, simply by a body of refrigerated liquid in the lower region of the storage compartment of a machine, the machine being provided with means for successively removing a plurality of bottles from said body of refrigerated liquid and presenting them to a delivery opening.

Another object of the invention is to provide a vending machine of this type having a minimum heat leakage into the refrigerated chamber through the bottle delivery opening. To this end, the bottle delivery opening is made only slightly larger than the cross-sectional area of the bottle, and the bottle delivery mechanism is arranged to move the bottle axially or longitudinally through said opening.

In line with the last-mentioned object, the invention also provides means for normally covering the bottle delivery opening, said covering means being adapted to be engaged by the bottle as the latter moves through the opening and to be thereby pushed aside to allow the bottle to pass through the opening, and being further adapted to return to closing position as soon as the bottle has cleared the opening.

Another object is to provide means operable as an incident to the bottle delivery for engaging and supporting the bottle in a position wherein a portion of it projects through the delivery opening and may be readily grasped by the customer. This is an important feature of the invention for the reason that the means for presenting the bottle beneath the opening and the means for elevating it into the opening and for returning the elevator to its original position are operated by a continuous forward movement of a coin-controlled actuating mechanism and the supporting means serves to prevent the bottle from dropping back through the opening when the elevator is retracted.

It is also an object of the invention to provide an elevating mechanism that serves to disengage the bottle from the conveyor mechanism while the bottle is being elevated.

Another object is to provide an appropriate means for guiding the bottle into delivery opening.

Other objects and advantages of the invention will become apparent from the following detailed description of an illustrative embodiment when considered in connection with the accompanying drawings, in which:

Figure 1:
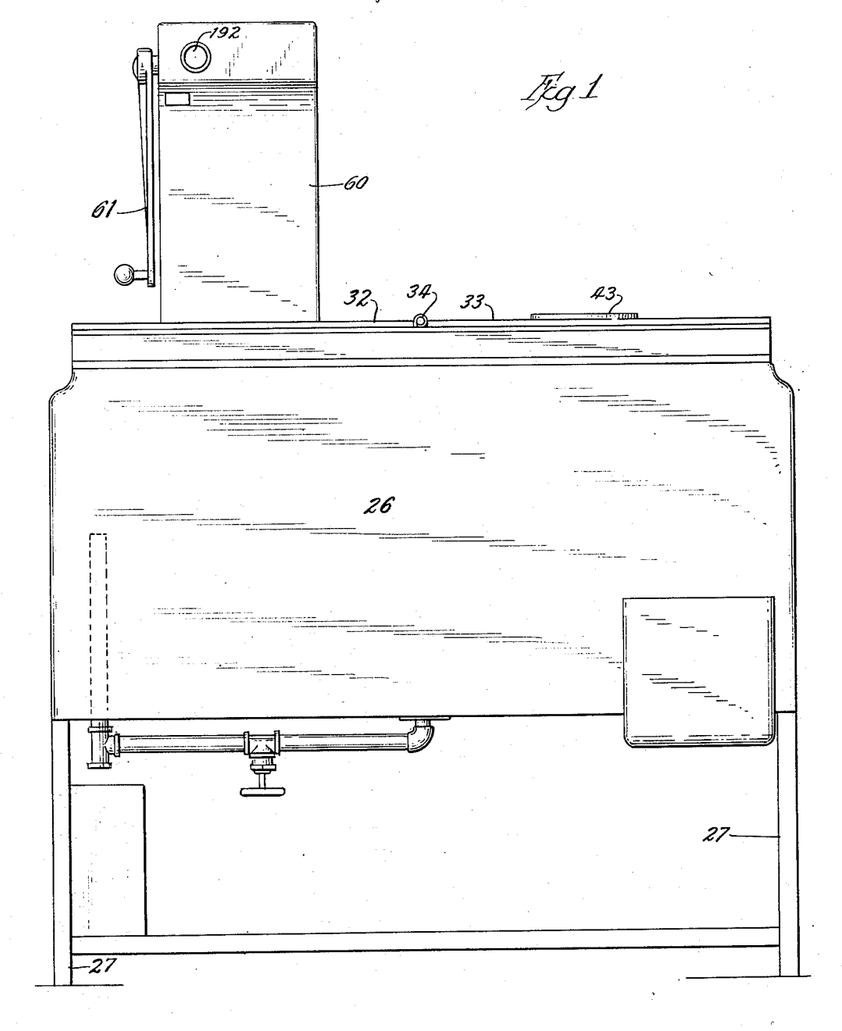
Fig. 1 is a front elevation of a vending machine embodying my invention.

Referring now to Fig. 1, the numeral 26 indicates a bottle storage cabinet or casing, supported upon legs 27 and having a removable top, comprising cover sections 32 and 33, hinged together at 34. The casing 26 has a bottom 29 (Fig. 3), end walls 30, and side walls 31 (Fig. 2), all of which are suitably insulated against conduction of heat into the interior of the casing.

Seated upon the upper edge of the walls 30 and 31 is a collar 35. Depending from the collar 35 are a series of brackets 36 on which is supported a rail 37 of the conveyor mechanism, which will hereinafter be more fully described. This arrangement allows the conveyor mechanism to be lifted bodily from the casing.

The cover sections 32 and 33 have flanges 38 which rest upon the collar 35. Gaskets 39 and 40 may be employed between the casing and the collar 35 and between the collar 35 and the covers 32, 33, respectively.

Figure 3:
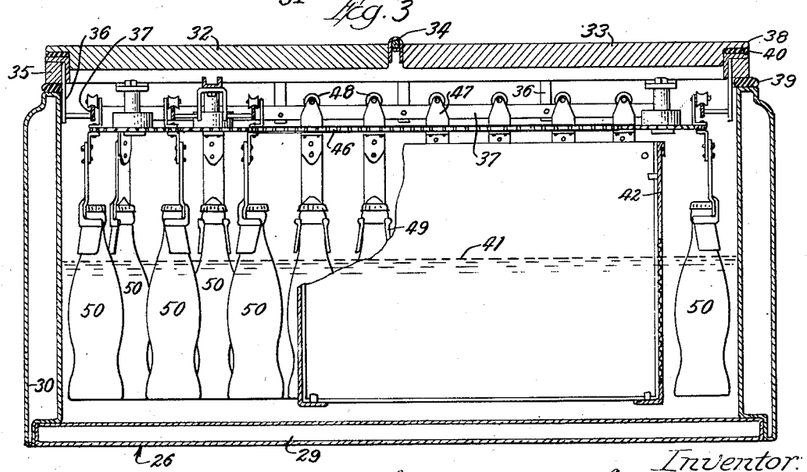
Fig. 3 is a longitudinal, vertical, sectional view through a portion of the same, taken just ahead of the operating box, the side plate of the latter being removed to illustrate the mechanism therein.

The casing 26 is adapted to hold a body of cooling liquid, indicated at 41 in Fig. 3 and in the embodiment shown, an enclosure 42 is provided within the casing, and spaced from the respective side walls thereof, for holding a block of ice for cooling the water.

Figures 15, 16, 22, 23, 24, 25:
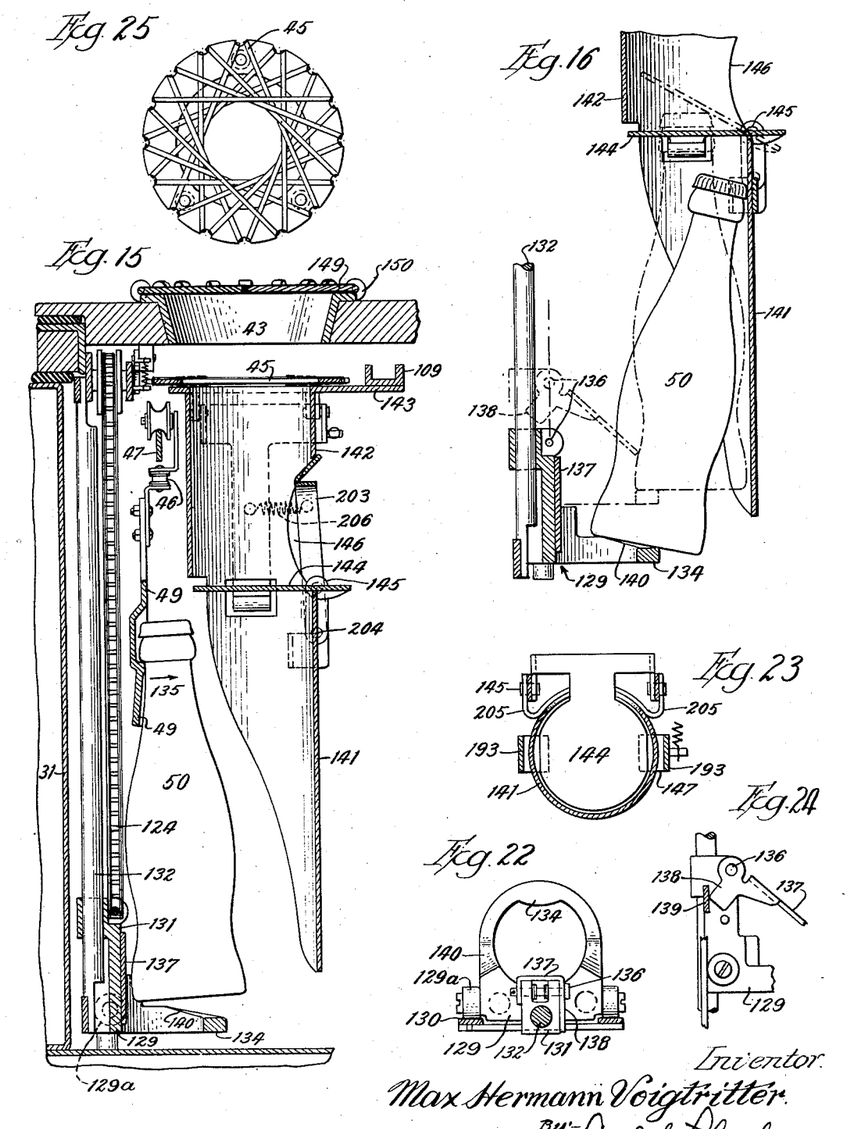
Fig. 15 is a transverse, sectional view through a portion of the machine illustrating details of the elevating mechanism.
Fig. 16 is a view of certain of the parts shown in Fig. 15, the same being illustrated in different relative positions.
Fig. 22 is a plan view of the elevator seat.
Fig. 23 is a horizontal, sectional view of the bottle delivery mechanism, taken on the line 23—23 of Fig. 18.
Fig. 24 is a side elevation of certain parts employed for sliding the bottles laterally into registry with the delivery opening.
Fig. 25 is a plan view of the bottle wiping device.

In the cover section 33 is a delivery opening 43 (Fig. 17) defined by a collar 44 set into said cover section 33. Just below the discharge opening 43 and registering therewith is a squeegee 45 (Figs. 2 and 25) through which the bottles pass on their way to the opening 43. The bottles are successively passed beneath the opening 43 by means of and endless conveyor, comprising a chain 46 (Figs. 2 and 3), a series of brackets 47 secured to the chain 46, a series of rollers 48 journaled in the brackets 47 and traveling upon the track 37, and a series of bottle supporting claws 49 (Fig. 20) secured to and depending from the chain 46 directly below the respective brackets 47.

The claws 49 are adapted to engage the necks of the bottles, indicated at 50, and to support the same partly immersed in the body of cooling liquid 41, as shown in Fig. 3.

The chain 46 (Fig. 2) passes around a series of idler sprockets 51, 52, 53, and 54, disposed in the four corners of the casing, respectively, and idler sprockets 57 and 58, which arrangement provides two reaches of the chain occupying the space between the ice compartment 42 and one end of the cabinet. A drive sprocket 55 is positioned between the sprockets 54 and 57 and an idler sprocket 56 is provided to hold the chain in engagement with said drive sprocket 55.

The operating mechanism includes a vertical shaft 59 (Figs. 2, 4, and 9) which extends from within the casing upwardly through the cover section 32 into the coin-mechanism box 60. The shaft 59, when released for rotation by the coin mechanism, which will hereinafter be more fully described, may be rotated by means of a crank handle 61 on a shaft 62 journaled in the upper region of the box 60, and connected by means of a clutch 63 (Fig. 6) to a shaft 64 journaled in a bearing 65 (Fig. 4) and carrying a bevel gear 66 meshing with a bevel gear 67 on the upper end of the shaft 59.

Figure 6:
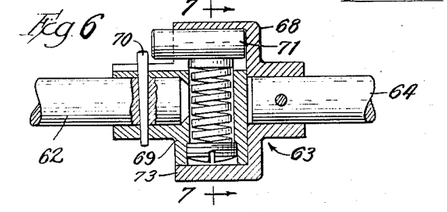
Fig. 6 is a detailed, sectional view through a portion of the operating mechanism, taken on line 6—6 of Fig. 4.
Figure 7:
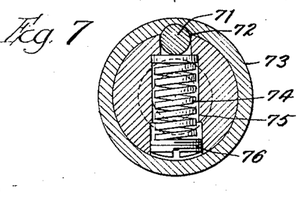
Fig. 7 is a cross-section through Fig. 6, taken on the line 7—7 of Fig. 6.

The clutch 63 comprises a drum 68 secured to the shaft 64 as shown, a shoe 69 secured upon the shaft 62 by a pin 70, and a roller 71 urged into engagement with a depression 72 in the inside of a peripheral flange 73 of the drum 68, by means of a compression spring 74 mounted in a cavity 75 in the shoe 69. The compression of the spring 74 is regulated by an adjusting screw 76. In the event of an attempt to force the rotation of the crank handle 61 without unlocking the mechanism, the roller 71 will be forced out of the depression 72 and will ride against the interior of the flange 73, allowing the shaft 64 to remain stationary.

Figures 4, 5:
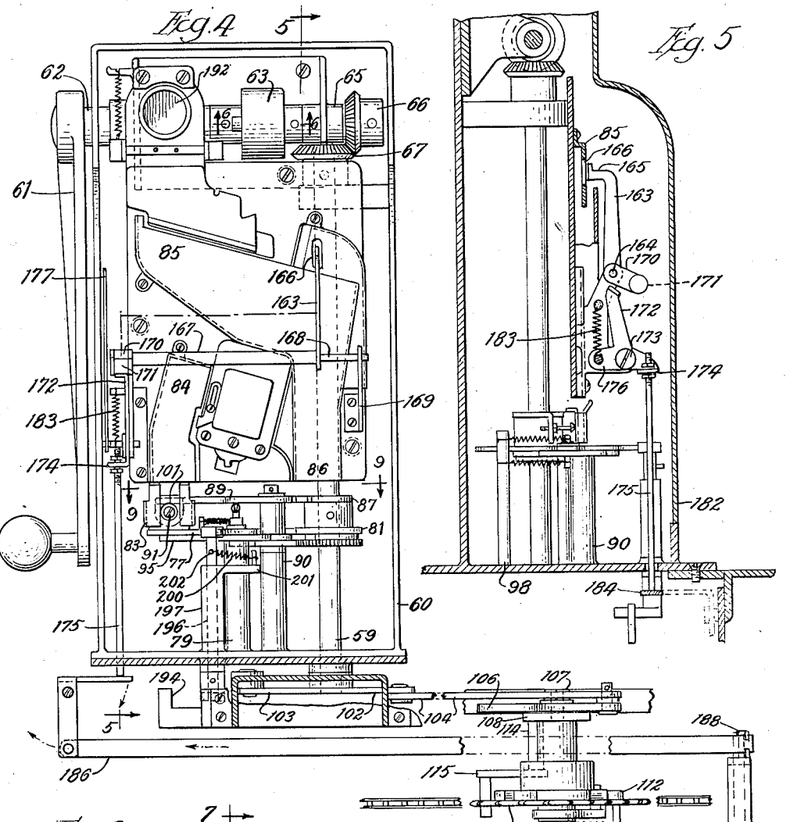
Fig. 4 is an elevational and sectional view (taken from front to back) of the coin-mechanism box showing also the operative connection of the coin mechanism with the conveying and vending mechanism in the body of the machine.
Fig. 5 is a vertical, sectional view through the operating box, taken as indicated by the line 5—5 of Fig. 4.

The shaft 59 is normally locked against rotation by a dog 77 (Fig. 9) pivoted upon a post 79 projecting upwardly from the bottom of the box 60, and normally extending into a notch 80 in a collar 81 fixed upon the shaft 59. The dog 77 has a tail portion 82 which carries an upwardly projecting coin pocket 83 normally positioned to receive a coin from the lower end of the good-coin chute 84 (Fig. 4). The good coins are separated from counterfeit coins, slugs, checks, etc., by means of a selector mechanism, indicated in Fig. 4 generally by the reference numeral 85. Unacceptable coins, slugs, etc., are rejected through a chute 86. The details of this mechanism are not shown since they form no part of the present invention but for a full disclosure of such a mechanism reference is made to pending application of Bert E. Mills, Serial No. 166,763, filed October 1, 1937.

Assuming now that a good coin has been received in the pocket 83 and that the customer has commenced to turn the handle 61, the initial rotation of the shaft 59 will cause a lug 87, secured to the shaft 59, to engage a tail 88 on an arm 89 pivoted upon a post 90 projecting upwardly from the bottom of the box 60. The other end of the arm 89 carries a feeler pin 91, which will be moved against the coin 92 in the pocket 83 by the swinging of the arm 89 caused by the initial movement of the shaft 59. The coin 92 serves as a connecting medium for transmitting the movement of the arm 89 to the dog 77, thereby moving the dog 77 out of the path of rotation of the collar 81 and allowing the shaft 59 to complete a full revolution, during which cycle of rotation a lug 93, indicated in dotted lines in Fig. 9, will engage against a finger 94 of a coin-supporting gate 95 normally held by a spring 96 in a position forming a bottom for the pocket 83 and supporting the coin 92 therein. As the finger 94 is thus engaged, the gate 95 will be swung to a position allowing the coin 92 to drop out of the pocket. Once the dog 77 has been lifted out of the notch 80, it will ride against the circular periphery of the collar 81 until the shaft 59 has nearly completed one revolution, thus allowing the coin to be dispensed with before the cycle of revolution is completed.

The dog 77 is urged into locking position by a spring 97 secured at one end to the tail 82 and at its other end to a pin 98 projecting upwardly from the bottom of the box 60. The spring 96 is secured at one end to the gate 95 and at its other end to the pin 98. The releasing arm 89 is maintained normally in the position shown in Fig. 9 by means of a spring 99 secured at one end to a pin 100 in the arm 89 and at its other end to the pin 98.

Figures 8, 9, 10:
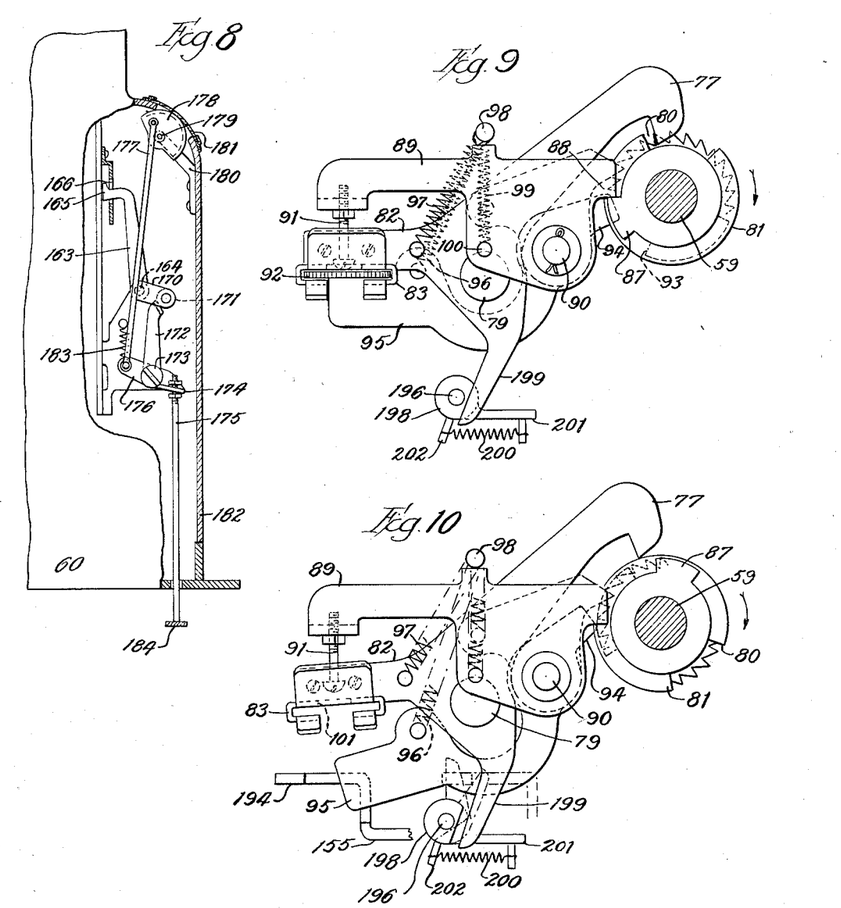
Fig. 8 is a side elevation of the operating box, a portion thereof being broken away and shown in section to illustrate the locking mechanism and "empty" signal.
Fig. 9 is a horizontal, sectional view of a portion of the operating mechanism, taken on the line 9—9 of Fig. 4.
Fig. 10 is a similar view with the parts in different relative positions.

In the absence of a coin 92 in the pocket 83, attempt to rotate the shaft 59 will result in the pin 91 passing through an opening in the pocket 83, indicated in dotted lines at 101 in Fig. 10, without affecting the position of the dog 77. Consequently, the shaft 59 will remain locked against further rotation.

Returning now to Figs. 2 and 3, the shaft 59 has at its lower end a lever including an arm 102 projecting in one direction from the shaft and an arm 103 projecting in the opposite direction. During the first half of the revolution of the shaft 59, the arm 102 will pull a link 104 in the direction indicated by the arrow 105, one end of said link 104 being pivoted to the end of the arm 102 and the other end of the link 104 being pivoted to one arm of a bell crank lever 106, which is pivoted upon a shaft 107, at the lower end of which is loosely mounted the sprocket 55. The shaft 107 is journaled in a bracket 108 supported by a frame 109 which carries the various sprockets 51—58 hereinbefore described. On the shaft 107 is secured an arm 110, to the end of which is pivoted a pawl 111 adapted, when the link 104 is moved in the direction 105, to advance through 90° of rotation a ratchet 112, which is secured to the sprocket 55. Thus the sprocket 55 is rotated 90° and the conveyor chain 46 is advanced a distance corresponding to the distance between the bottle holders.

When the shaft 59 has completed a half revolution, the other arm of the bell crank lever 106 will engage an arm 113 and swing the same about its pivot 114, causing a locking arm 115, rigidly associated with the arm 113, to enter between two teeth of the sprocket 55 and to prevent further rotation of the sprocket. This is to avoid overrunning of the conveyor mechanism in the event of too vigorous operation of the crank handle 61.

As the shaft 59 proceeds into the second half of its revolution, the link 104 will commence to return to its normal position, retracting the dog 111 to the next tooth of the ratchet 112. At the same time, the arm 103, which carries at its end a roller 116, will approach and cause the roller 116 to engage a lug 117 on the elevating mechanism, which will now be described. (See Figs. 11-14.)

Secured to one of the side walls 31 of the casing are a pair of bearing brackets 118 and 119, in which is slidably mounted a squared slide rod 120. To one end of the rod 120 is attached a fork 121 between the bifurcations of which are journaled pulleys 122 and 123. An elevator chain or cable 124 is secured at 125 to a yoke 126 formed integrally with the bearing 119, thence passes around the pulley 122, pulley 127 journaled in the yoke 126 in a fixed position, the pulley 123 and a pulley 128 also journaled in the yoke 126 in a fixed position, and thence is extended downwardly. To the lower end of the downwardly extending portion of the chain 124 is secured the elevator carriage 129, which has rollers 129a rollable on vertical rails 130 and has a bearing portion 131 slidably receiving a rod 132 fixedly associated with the slideways 130.

Figure 2:
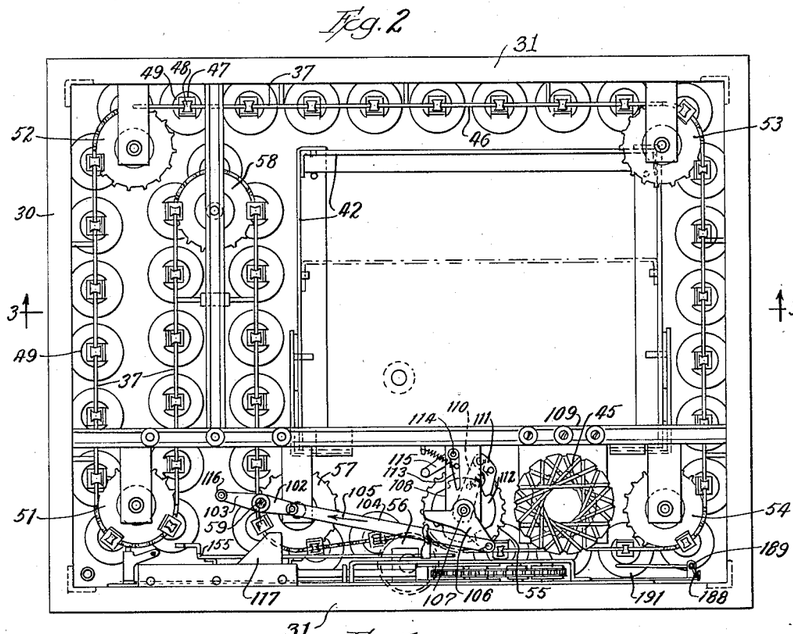
Fig. 2 is a plan view of the same with the top removed.
Figures 12, 13, 14:
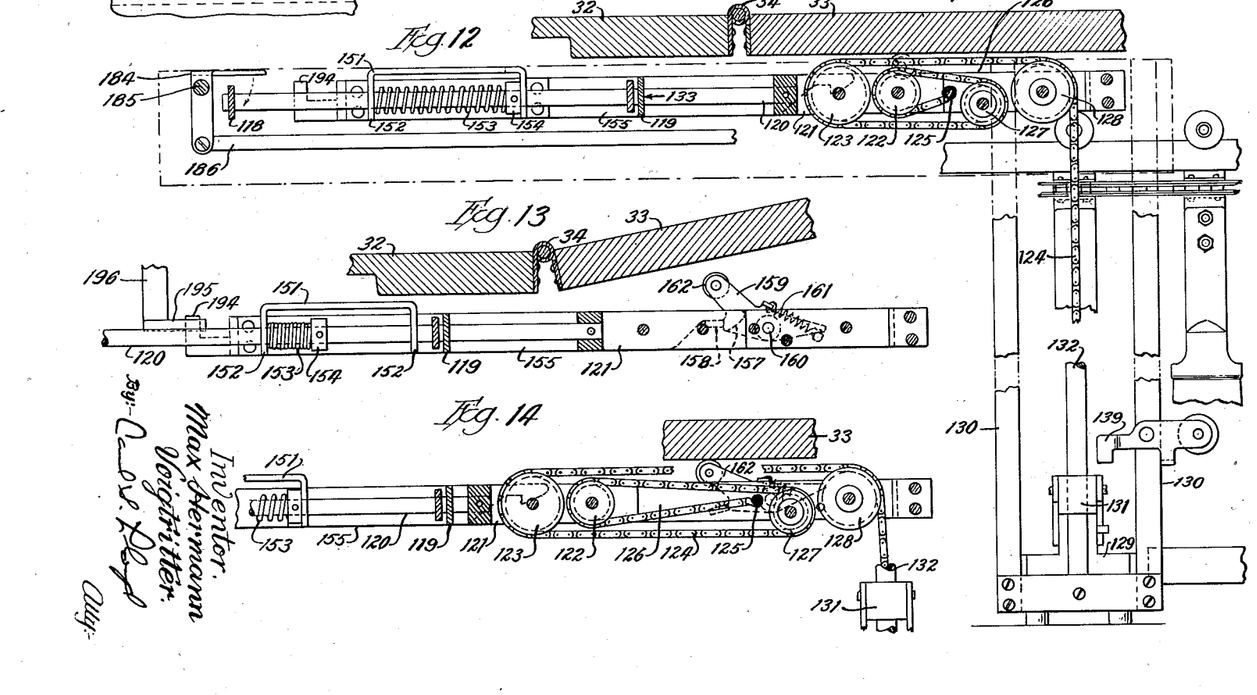
Fig. 12 is a vertical, longitudinal, sectional view, through a portion of the machine illustrating the elevating mechanism.
Fig. 13 is a view of certain of the parts shown in Fig. 12, the same being shown in different relative positions.
Fig. 14 is a view of certain of said parts shown in still different positions.

It will now be noted, by reference to Figs. 2 and 12 that as the shaft 59 continues to rotate, the arm 103 will move the elevator slide rod 120 in the direction indicated by the arrow 133 in Fig. 12, whereupon the rollers 122 and 123 will extend the several loops of the chain 124, with which they in effect form a block-and-tackle arrangement, so as to elevate the carriage 129 at a rate four times as fast as the movement of the slide rod 120. This is for the purpose of securing sufficient vertical movement of the elevator.

Referring now to Figs. 15, 16, 17, and 18, it will be noted that the elevator carriage 129 moves in a plane closely adjacent to but just outside of the bottle-supporting claw 49 of the conveying mechanism. The carriage 129 has an integral seat 134 projecting laterally beneath the claw 49 and shaped in the form of a ring so that as it moves upwardly the depending claw 49 may pass entirely through it. As it proceeds upwardly, the elevator seat will engage a lower corner of the bottle 50 and its ensuing upward movement will cause the bottle to tip laterally as indicated by the arrow 135 (Fig. 15) so that the neck of the bottle will become disengaged from the supporting claw 49.

The lower region of the bottle will be moved laterally by a pusher (Fig. 24) in the form of a bell crank lever pivoted at 136 to the elevator carriage 129, having an arm 137 normally depending between the bottle and the carriage 129, and an arm 138 extending at right angles to the arm 137 and adapted as the carriage 129 moves upwardly to engage a projection 139 (Fig. 12) attached to one of the rails 130. This will cause the arm 137 to swing outwardly and push the bottle 50 laterally, causing it to ride down the inclined portions 140 of the seat 134 until the bottle reaches the position shown in Fig. 17 in which the lower corner is engaged by the outer extremity of the seat 134.

As the bottle tips laterally, it is caught by a guide skirt 141 forming the lower extremity of a guide sleeve 142 attached by means of a bracket 143 to the frame 109. The bracket 143 also serves to support the bottle-wiping squeegee 45.

As the bottle is elevated, it will pass a gate 144 (Fig. 15) hinged at 145 to brackets 205 (Fig. 23) attached to the skirt 141 and projecting through an opening 146 in the sleeve 142. The bottle will thence pass into the sleeve 142. The purpose of the gate 144 is to prevent unauthorized removal of bottles from the machine. As the gate is moved laterally by the bottle at the upper limit of its opening movement, it will engage a yieldable stop 203 pivoted at 204 to the brackets 205, and will move the stop 203 outwardly against the pull of a spring 206 attached at one end to the stop 203 and at its other end to the sleeve 142. When the bottle is removed, the stop 203 will tip the gate 144 back to a position from which it will drop to its normal horizontal position. It is supported in the latter position by hooks 147.

Figures 17, 18, 19, 20, 21:
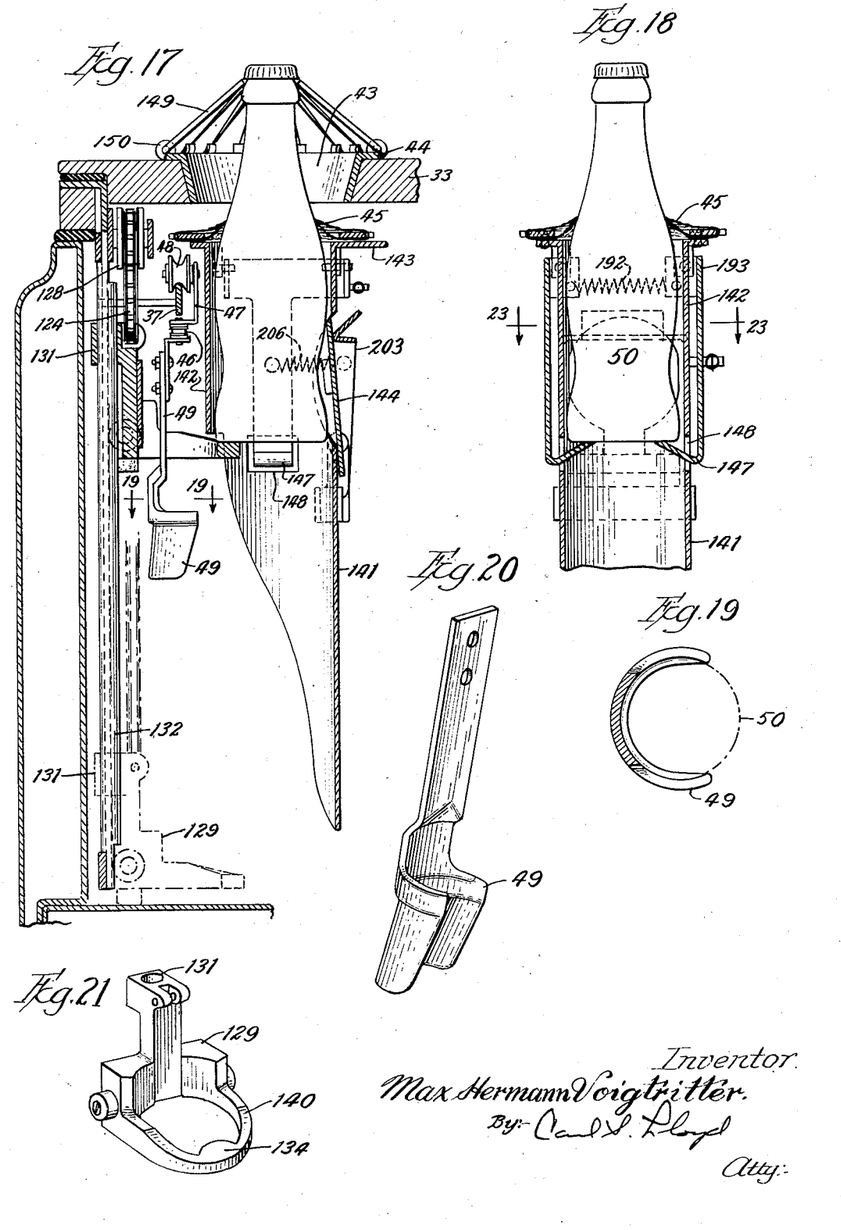
Fig. 17 is a view like Fig. 15 showing the parts in still different positions.
Fig. 18 is a cross-sectional view through the delivery mechanism.
Fig. 19 is a horizontal, sectional view, taken on the line 19—19 of Fig. 17.
Fig. 20 is a perspective view of the bottle supporting claw of the conveyor mechanism.
Fig. 21 is a perspective view of the elevator seat.

Hinged to opposite sides of the sleeve 142, and urged toward each other by a spring 192, are a pair of fingers 193, the lower ends of which are formed with hooks 147 projecting through openings 148 in the sleeve 142, said hooks being inclined upwardly so as to be sprung aside by the bottle as it moves upwardly and being then adapted to spring into place beneath the bottom of the bottle, as shown in Fig. 18, to support the same in the sleeve 142. In this position, as is shown in Fig. 17, the neck of the bottle projects upwardly through the opening 43 in the cover section 33 of the casing, and has lifted and spread apart sector-shaped closure members 149 which are hinged at 150 to the collar 44 and normally close the opening 43. The bottle may then be grasped by the hand of the customer and pulled on through the opening 43.

The closure members 149 are primarily for the purpose of preventing escape of cooled air from the interior of the casing but they also tend to discourage attempts to abstract a bottle from the machine without operating the coin mechanism.

As the shaft 59 nears the completion of its revolution, the roller 116 on the arm 103 will slip from the end of the lug 117 of the elevator mechanism, whereupon the elevator carriage will descend by its own weight, returning the slide bar 120 to the normal position shown in Fig. 12.

Figure 11:
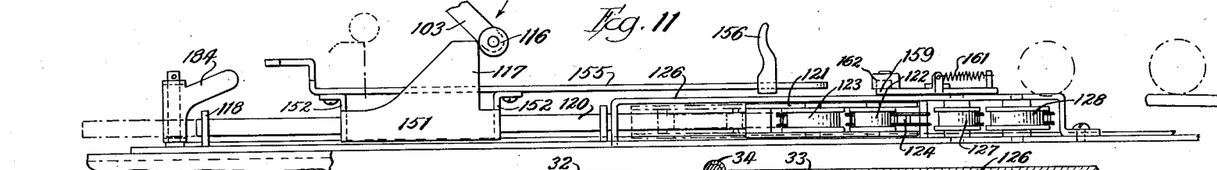
Fig. 11 is a plan view of the elevating mechanism.

During loading of the machine, the elevating mechanism is rendered inoperative by moving the lug 117 out of the path of the roller 116. To this end, the lug 117 is adjustably connected to the elevator slide rod 120 being formed integrally with a yoke 151 (Figs. 11-14), the ends 152 of which form bearings in which the rod 120 is slidably mounted. The yoke 151 is normally maintained in the position shown in Fig. 12 by means of the coil spring 153 engaged at one end against a member 152 and at its other end against the collar 154 attached to the rod 120. A bar 155 attached to the yoke 151, as shown in Fig. 11, is provided with a finger engaging member 156 by means of which the yoke 151 may be pulled forwardly with respect to the rod 120, compressing the spring 153, until the relative positions shown in Fig. 13 are attained. In this position, a hook 157 on the forward end of the bar 155 will be engaged by a lug 158 on a locking pawl 159 pivoted at 160 to the fork 121 of the slide bar 120. The pawl 159 is urged by a spring 161 into locking engagement with the hook 157, the latter being adapted to slide over the pawl and depress the same as the bar 155 is advanced. In this advanced position of the yoke 151, the lug 117 will be removed from the path of movement of the roller 116 so that the conveyor mechanism may be operated without operating the elevator mechanism.

In order that the drive shaft 59 may be continuously operated so as to advance the conveyor during the loading operation, the bar 155 is provided at its rear end (Figs. 10 and 13) with a hook 194 adapted, when the bar 155 is moved to loading position, to engage a lever 195 on the lower end of a cam shaft 196 journaled in a bearing 197 formed in the bottom of the coin-mechanism box 60, and to rotate a cam 198 on the upper end of said shaft 196, into engagement with a tail member 199 on the dog 77, thereby moving the dog 77 out of the path of rotation of the collar 81, and allowing the shaft 59 to rotate freely. When the bar 155 moves back to normal position, the shaft 196 is returned to normal position by a spring 200, one end of which is attached to a bracket 201 formed on the bearing 197 and the other end of which is attached to a pin 202 mounted in the shaft 196.

When the loading of the machine is completed, the elevator is again set for operation by simply dropping the cover 33, the latter engaging a roller 162 on the end of the pawl 159 and depressing the pawl so as to release the lug 158 from engagement with the hook 157, thus allowing the yoke 151 to spring back to its normal position relative to the slide rod 120.

Turning now to Fig. 8, I provide means for locking the coin mechanism when the machine is about empty, and simultaneously showing a signal to indicate the empty condition. It comprises an arm 163 pivoted at 164 on the coin mechanism and having a finger 165 adapted to enter a slot 166 in the coin chute. The arm 163 is carried on one end of a sleeve 167 (Fig. 4) which is pivoted on a pin 168 carried by brackets 169. The other end of the sleeve 167 is attached to an arm 170 having a roller 171 adapted to be engaged by a lever 172 pivoted at 173 on one of the brackets 169. The lever 172 forms part of a T-shaped bell crank lever including an arm 174 engaged by a push rod 175. The other arm 176 of the bell crank lever is pivoted to a link 177 which projects upwardly and is pivoted at its upper end to a sector-shaped empty signal 178. The signal 178 is rotatably mounted at 179 on a bracket 180 and is visible through a window 181 in the cover 182 of the coin box 60. A spring 183 urges the link 177 toward the upper limit of its movement, in which position the empty signal will be visible and the finger 165 will block the coin chute. The parts are normally maintained in inoperative position, however, by the push rod 175 being engaged by a bell crank lever 184 (Figs. 11 and 4) pivoted at 185 to the side of the casing, normally held in raised position supporting the rod 175, by means of a link 186.

One end of the link 186 is pivoted to the bell crank lever 184 and the other end (Fig. 4) is restrained by a fork 188, secured on the upper end of a rod 189 pivoted in the bracket 190 secured to the side of the casing and having in its lower end an arm 191 adapted to ride against the necks of the bottles approaching the elevator mechanism (see Figs. 4 and 2). When the last bottle passes the arm 191 or when an empty conveyor claw reaches the arm 191, the latter will move bodily under the urge of the spring 183 in the coin box, and will allow the coin-locking mechanism and empty signal to move into operative positions. The refilling of the machine will restore this mechanism to normal inoperative position.

In the operation of the machine, a coin is first inserted into a coin-receiving opening 192 at the upper end of the selector mechanism 85. If it is not acceptable, it will be rejected through the chute 86. If an acceptable coin, it will be delivered through the good coin chute 84 into the pocket 83 on the tail portion 82 of the locking dog 77.

The operator, after inserting the coin, commences to turn the handle 61. If no coin has been inserted, or if the coin has not been accepted by the selector mechanism, so that the pocket 83 remains empty, the initial rotation of the shaft 59 will cause the pin 91, mounted in the end of the arm 89, to pass through the opening 101 in the pocket 83. The position of the dog 77 is not affected by this movement, and the dog 77 will remain in locking engagement with the notch 80 in the collar 81 fixed upon the shaft 59. By the time the pin 91 has been projected a predetermined distance through the opening 101, the region of the collar 81 defining the end of the notch 80 will engage the dog 77 and further rotation of the shaft 59 will thereby be prevented.

If the coin has been accepted and deposited in the pocket 83, the pin 91 will engage the coin and further movement will cause the dog 77 to be pivoted to a position releasing the collar 81 for further rotation.

During the first half of the revolution of the shaft 59, the arm 102 secured to the lower end thereof will pull the link 104 (Fig. 2) in the direction indicated by the arrow 105, pivoting the bell crank lever 106 and thereby causing the pawl 111 to advance the ratchet 112 through ninety degrees of rotation. This causes the sprocket 55 to rotate so as to advance the conveyor chain 46 a distance corresponding to the distance between two adjacent bottle holders. As a result, the conveyor will advance a bottle to a position substantially beneath the delivery opening 43 and directly above the elevator seat 134.

This movement will cease when the arm 102 passes the 180-degree point, the remaining movement of the link 104 being a retrograde one, serving to restore the pawl 111 to its initial position, ready for the next operation.

After the shaft 59 has completed a half revolution, the arm 103 of the operating lever will engage the lug 117 of the elevating mechanism. As the shaft 59 continues to rotate, the arm 103 will move the elevator slide rod 120 in the direction indicated by the arrow 133 in Figure 12, causing the elevator carriage 129 to move upwardly between the rails 130. The elevator seat 134 will then engage one side of the bottom of the bottle 50 and exert upward lifting movement against the bottle, causing the bottle to tip laterally toward its other side so as to disengage the neck of the bottle from the claw 49, and bring it into position directly beneath the delivery opening 43. The lower region of the bottle will, as the elevator carriage proceeds upwardly, be slid laterally by the arm 137, down the incline 140 until the corner of the bottle is supported upon the outer extremity of the seat 134.

As the bottle tips laterally, it is caught by the guide skirt 141, which guides it into the guide sleeve 142 as the elevator continues to move the bottle upwardly.

As the bottle passes into the sleeve 142, it lifts the gate 144. When the elevator reaches its upper limit of movement, the bottle will have passed completely into the sleeve 142, its upper end will be projecting through the delivery opening 43, and its lower end will have passed beyond the supporting hooks 147 which, after having been sprung aside by the bottle, will spring back into position to prevent the bottle from dropping back with the elevator when the latter is released and allowed to drop back to its initial position. As the elevator withdraws its support, the bottle will settle back upon the hooks 147 and be thereby supported with its neck projecting through the delivery opening 43, until the customer removes it from the machine.

The elevator is released when the roller 116 of the arm 103, in the forward rotation of the latter, finally clears the lug 117. The cycle of operation will then be complete and the machine will be ready for another operation.

It will be understood that the foregoing detailed description is for the purpose of illustration only and is not to be taken as limiting the scope of the appended claims to which reference should be had in order to determine the true breadth of the invention.

I claim as my invention:

1. In a machine for vending bottled goods, a casing having a discharge opening in its top, means comprising an overhead conveyor for supporting and conveying a plurality of bottles in upright positions so as to present said bottles successively to a point substantially beneath said opening, means for engaging a bottle thus presented and moving the same out of engagement with the conveyor and upwardly to a position wherein it is accessible to a customer through said opening, and means operable from the exterior of the machine for actuating said conveying and elevating means.

2. In a machine for vending bottled goods, a casing having a discharge opening in its top, means for successively presenting a plurality of bottles in upright position beneath said opening, means for engaging a bottle thus presented and elevating the same axially to a position wherein the neck of the bottle projects through said opening so that it may be readily grasped in the hand of a customer, closure means for said opening adapted to be lifted by the bottle as the latter approaches said position, said closure means comprising a plurality of rigid sectors hinged to the periphery of said opening and projecting toward the axis thereof so as to close said opening when no bottle is present therein, and actuating mechanism under the control of the operator for operating said presenting and elevating means.

3. In a machine for vending bottled goods, a casing having a discharge opening, means for supporting and conveying a plurality of bottles so as to present said bottles successively adjacent the opening, said conveying means being disposed in the upper part of said casing and including claws adapted to grasp the necks of the bottles so as to support the bottles in positions depending into the casing, and means under the control of the customer for actuating said conveyor.

4. In a machine for vending bottled goods, a casing having a discharge opening in its top, a conveyor for successively presenting a plurality of bottles beneath said opening, an elevator including a laterally projecting seat adapted to engage one side of the bottom of the bottle thus presented, and to move the bottle laterally out of engagement with the conveyor while lifting the bottle, a guide opposed to said seat in position to receive the bottle as the latter is moved laterally and to guide the bottle into said opening during the elevating process, and means under the control of the customer for actuating said conveyor.

5. In a machine for vending bottled goods, a casing having a delivery port in its top wall, an elevator for raising bottles to said delivery port, including a vertically movable carriage having a seat adapted to engage the bottom of the bottle, means for guiding said carriage in its vertical movement, and a pusher pivoted to said carriage and adapted to engage a fixed portion of the machine during upward movement of the carriage and to thereupon swing outwardly and move the bottle laterally.

6. In a machine for vending bottled goods, a casing having a delivery port, means for conveying bottles so as to present them successively to said port, an elevator for elevating bottles to said port, comprising vertical guideways, a carriage slidable in said ways, said carriage having means to engage and lift a bottle, a horizontal slide, a block and tackle connecting said horizontal slide to said carriage, and operating means under the control of a customer for first advancing said conveying means, then moving said horizontal slide so as to raise the elevator, then releasing said slide to allow the elevator to drop.

7. In a machine for vending bottled goods, a casing having a cover, an elevator for elevating bottles to a discharge opening therein, means for rendering said elevator inoperative during loading, and means for releasing said first means, comprising a trigger adapted to be engaged and operated by the cover as it is dropped to closed position.

8. In a machine for vending bottled goods, a casing having a delivery port, conveying means for successively presenting bottles to said port, an operating member for cyclically actuating said conveying means, and an elevator for elevating the bottles from the conveying means to the port, said elevator including a vertically reciprocable bottle supporting carriage, a reciprocable slide adapted to be moved in one direction by said operating member during a portion of each cycle of operation, and then allowed to return to its starting point, and means connecting said slide to said carriage, adapted to raise said carriage at a rate multiplied with respect to the rate of movement of the slide.

MAX HERMANN VOIGTRITTER.